United States Patent Office 3,279,776
Patented Oct. 18, 1966

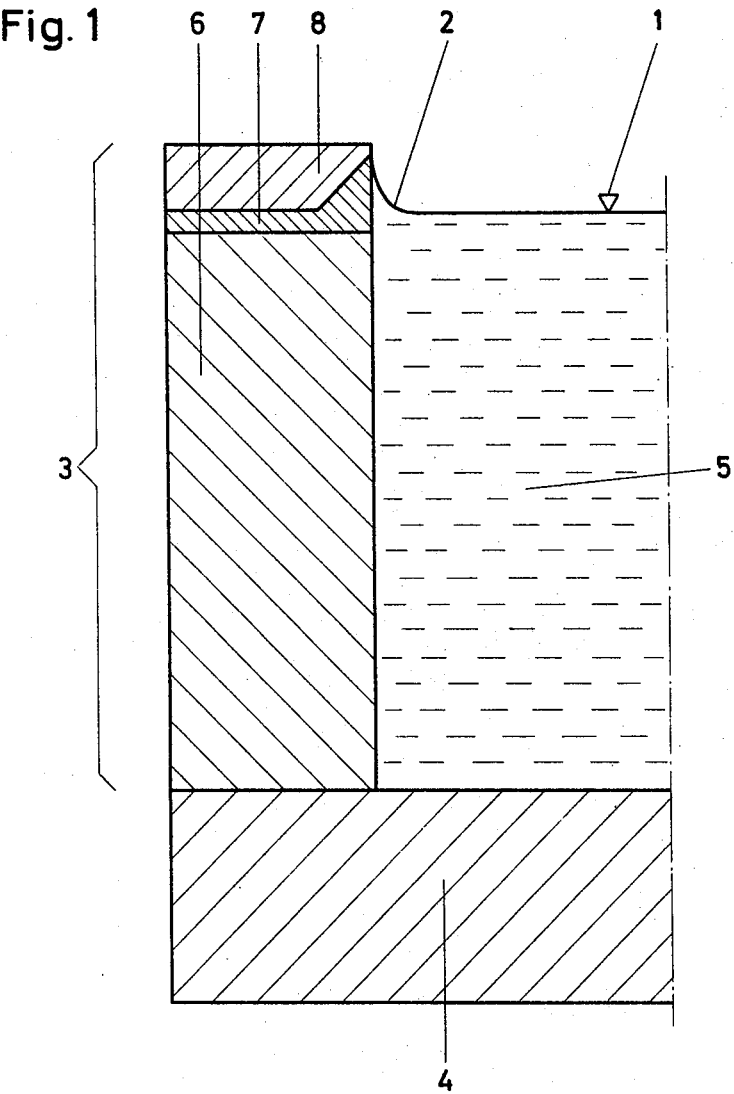

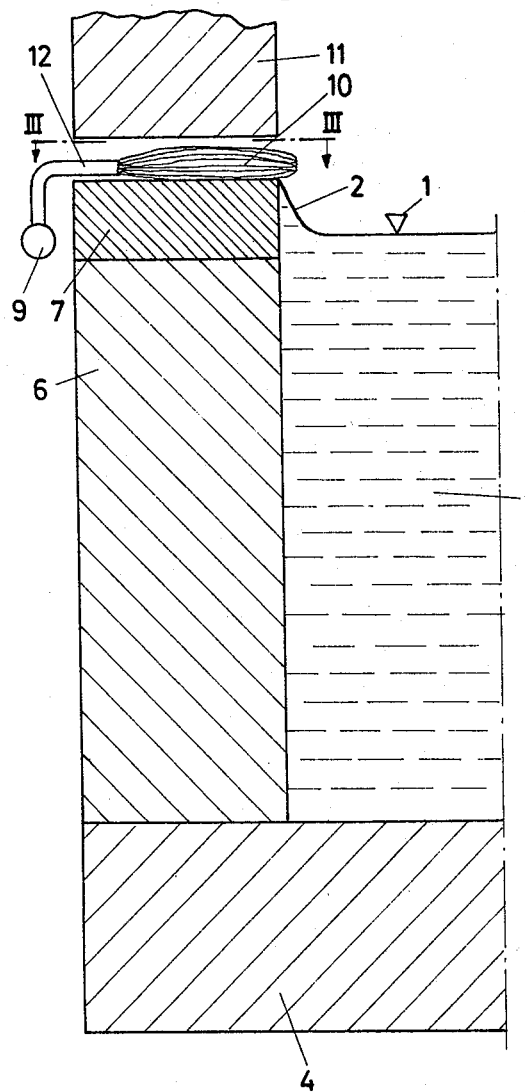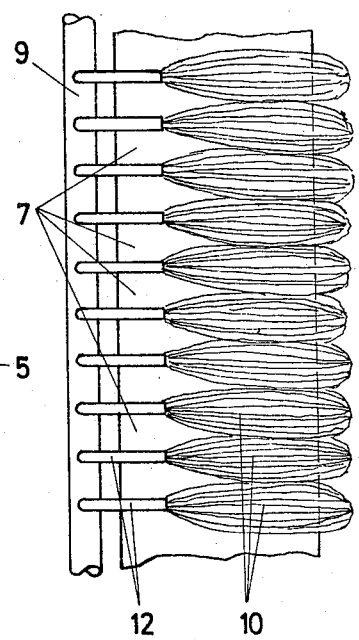

3,279,776
GLASS MELTING VATS HAVING REFRACTORY BRICKS CONTAINING CHROMOXIDE
Johannes Löffler, Witten (Ruhr), Germany, assignor to Deutsche Tafelglas Aktiengesellschaft Detag, Furth, Bavaria, Germany, a corporation of Germany
Filed Dec. 8, 1964, Ser. No. 416,737
Claims priority, application Germany, Dec. 16, 1963, D 43,183
10 Claims. (Cl. 263—46)

This invention relates to glass melting tank furnaces, equipped with chromium-oxide-containing, refractory bricks.

One of the zones in glass melting tank furnaces which is stressed to the greatest extent is the so-called surface curve which is located at the point at which the glass surface contacts the lateral walls consisting of refractory bricks. At that zone, as is known, the material of the walls is attacked to a very much greater extent than it is below the glass level. Due to this factor, the working life of the furnaces is shortened and furthermore the glass itself is contaminated by the products of dissolution of the refractory bricks, so that production is detrimentally influenced.

Many attempts have been made either to prevent the above-discussed phenomena or to make them technologically ineffective. It is for example generally conventional first of all to cool considerably those points at which the refractory walls would be eaten through in a very short period of time and later, when cooling of this kind is no longer effective, to reinforce these parts with the aid of a new layer of bricks. However, even this does not prevent the continuous contamination of the glass by the dissolution product.

Furthermore, various substances have been described as being especially resistant to "the action of the glass melt," but in most cases it has not been specified whether this means resistance at the level of the surface curve or at any desired other zones. There has been no lack of attempts to introduce such especially resistant refractory substances into the construction of glass furnaces. Detailed tests have shown that the strong attack of the glass at the surface curve is substantially produced due to the alumina content of the refractory bricks. However, attempts to overcome the technological disadvantage of alumina-containing bricks by using bricks which contain no alumina have hitherto had very little success. For example, furnace-building substances are known which consist of chromium oxide which has either been melted in an arc furnace or ceramically burnt. It is true that this chromium oxide resists the attack of the glass at the surface curve, but it has its own properties due to which it cannot readily be used. For example, as is known, it reacts with the alkali vapor or alkali-containing dust which is always present in the atmosphere in glass melting furnaces, together with the oxygen of the air which is also always present in this zone and in the surface curve, in such manner as to form chromates which, as relatively readily-fusible salts, collect at specific points in the furnace and result in considerable difficulties. It has furthermore been observed that the chromium oxide has, in oxygen-containing atmosphere, a slight but nevertheless noticeable volatility which may increase the above-described effect still further. A further disadvantage of the chromium-oxide-containing refractory bricks is the strong discoloration imparted thereto by even small quantities of $Cr_2O_3$ dissolved in glass.

It has now been found that the above-discussed disadvantages of chromium-oxide-containing refractory bricks can be obviated in two ways. According to the first mode of procedure, a "curtain" of small gas flames is allowed to burn at the part of the bricks adjacent the air. A "curtain" of small gas flames of this kind forms a neutral or even reducing protective gas atmosphere and therefore prevents both the formation of the detrimental alkali chromates and simultaneously also the volatility of the $Cr_2O_3$ appearing only in an oxygen atmosphere. A protective gas atmosphere of this kind is readily prepared by causing the said small flames to burn from a series of parallel combustion gas inlets extending perpendicularly to the wall but arranged obliquely relatively to the surface of the chromium-oxide-containing bricks adjacent the air. The burners used for heating the furnace cannot be so controlled that they achieve the same effect.

A second possibility of obviating the aforesaid disadvantages is as follows:

The corrosion on the walls at the level of the surface curve rapidly "eats" through the entire brick forming the said wall "in depth" i.e. perpendicularly to the wall; on the other hand, its height is limited. It begins with only a few centimetres and then gradually increases somewhat but, on the average, it attains a height of only 10 to 20 cm. By inserting refractory bricks having a high chromium oxide content, not only is the depth of the corrosion diminished but also the vertical "growth" is greatly diminished. Thus, a relatively narrow zone of chromium-oxide bricks will suffice.

By this means, also the disadvantage of the discoloration of the glass due to the dissolution of $Cr_2O_3$ is restricted to a minimum.

The reaction of the chromium oxide with the alkali vapor and oxygen in the air is, according to the invention prevented by means of a special shape of the bricks. The glass form a rising meniscus with each refractory wall. For as far as this extends, the glass melt is to be located adjacent only bricks of chromium oxide or of mixtures of chromium oxide with other oxides, excluding alumina and silicic acid. The bricks used for this purpose are given a shape which permits covering by another refractory brick, for example they are given a taper towards the cold part of the wall.

For a better understanding of the invention, embodiments thereof will now be described, by way of example, with reference to the accompanying drawings, wherein:

FIGURE 1 shows a cross-section through a portion of a glass melting tank furnace;

FIGURE 2 shows a modification of the embodiment of FIGURE 1, and

FIGURE 3 is a section taken along the line III—III of FIGURE 2.

Reference numeral 3 in the drawings designates the entire, refractory lateral wall of the glass melting tank furnace and 4 designates the bottom thereof. The surface of the glass melt is designated 1. The glass surface merges at 2 into an ascending meniscus. The glass melt itself is designated 5. Arranged above the lateral wall part 6 made of standard refractory brick is a brick 7 which is made of a chromium-oxide-containing material and which is covered by a covering brick 8 made of any desired material. Advantageously, the covering brick 8 consists of one of the conventionally fusibly-poured mixtures of a considerable quantity of alumina with a small quantity of silicic acid with or without $ZrO_2$.

In FIGURE 1, the superstructure of the glass melting tank furnace has been omitted, since its construction is not essential for understanding the invention. As apparent from the drawing, the shape of the chromium-oxide-containing brick 7 can be varied to a considerable extent, so as to adapt it to the specific conditions of each case. However, the height of the chromium-oxide-containing brick should not be substantially above that of the glass meniscus since, in this case, the reaction between sodium oxide vapor, oxygen and chromium oxide would take place. In this case, however, it is also possible to provide a solution by first of all making the glass surface somewhat higher and then lowering it again as soon as the chromium-containing material has been completely wetted.

Whereas the chromium-oxide-containing brick 7 according to FIGURE 1 widens towards the inner wall of the furnace 2, in the embodiment according to FIGURES 2 and 3 a standard, cubic, chromium-oxide-containing brick 7 may also be provided. In the embodiments according to FIGURES 2 and 3, there is provided over the surface of the chromium-oxide-containing brick 7 a series of combustion gas feed pipes 12 extending parallel to each other and perpendicular to the wall and adapted to be fed from a collective pipe 9. The gas flames of the combustion gas feed pipes 12 are shown at 10. Above the flames 10 is the superstructure 11.

The invention relates to all refractory bricks 7 which are substantially free from aluminium oxide and have a small $SiO_2$ content but which have a considerable chromium oxide content. Thus, this includes also bricks which, in addition to the considerable chromium oxide content, have a certain zirconium oxide content.

The covering 8 made a material which does not contain chromium may, in order where required to provide for simpler construction of the furnaces, be adhesively secured with the aid of an adhesive which does not readily melt in order to make the joint between the covering 8 and the chromium oxide-containing sector as thin as possible.

Thus, the invention relates to the protection of the horizontal surface of the chromium-oxide-containing brick 7 against chromate formation by oxygen and other influences. This protection is provided either (according to FIGURE 1) by the covering brick 8 or (according to FIGURES 2 and 3) by the protective gas atmosphere.

What is claimed is:

1. A glass melting vat having ascending walls constituted substantially of alumina-containing refractory furnace-building materials and adapted for containing a glass melt therein to a determinable level, said vat comprising a horizontally extending top layer on said wall at a level corresponding approximately to that of the meniscus of the glass melt, said layer being constituted of an alumina-free and low silicic acid highly refractory material, which consists essentially of chromium oxide or mixtures of chromium oxide and zirconium oxide and protective means at the surface of the top layer for protecting the chromium oxide contained therein against the action of alkali-containing vapors and air.

2. A glass melting vat according to claim 1, wherein the chromium oxide-containing top layer is formed of furnace bricks which have an upper surface at the inner surface of the wall approximately at the level of the top edge of the meniscus of the glass melt.

3. A glass melting vat according to claim 2, wherein the furnace bricks forming the chromium oxide-containing top layer include a flat cross-sectional portion and an approximately trapezoidal cross-sectional portion of increasing depth connected to said flat portion and extending towards the inner surface of the walls.

4. A glass melting vat according to claim 1, wherein said protective means for the surface of the chromium oxide-containing top layer comprises a covering of furnace-building material mounted on said top layer.

5. A glass melting vat according to claim 1, wherein said protective means for the surface of the chromium oxide-containing top layer comprises means above the latter surface for the discharge of a neutral or weakly reducing atmosphere of protective gas directly above said top layer.

6. A glass melting vat according to claim 5, wherein said means for the discharge of protective gas comprises a plurality of parallel gas feed pipes extending perpendicularly to the inner surface of the wall.

7. A method of minimizing the adverse effects produced at the upper surface of a glass melt between the melt and the walls of a glass melting furnace, said method comprising forming the walls of the furnace at the level of the upper surface of the melt with a layer of relatively high refractory material which is substantially free of alumina and silicic acid and which consists essentially of chromium oxide or mixtures of chromium oxide and zirconium oxide, and insulating the upper surface of said layer of relatively high refractory material from contact with oxygen and alkali-containing vapors by passing a neutral or weakly reducing gas above the upper surface of said layer transversely of the walls of the furnace towards the interior thereof.

8. A method as claimed in claim 7, wherein said layer of high refractory material is formed with its upper surface at the level of the top of the meniscus formed at the upper surface of the melt.

9. A method of minimizing the adverse effects produced at the upper surface of a glass melt between the melt and the walls of a glass melting furnace, said method comprising forming the walls of the furnace at the level of the upper surface of the melt with a lyer of relatively high refractory material which is substantially free of alumina and silicic acid and which consists essentially of chromium oxide or mixtures of chromium oxide and zirconium oxide, and insulating the upper surface of said layer of relatively high refractory material from contact with the oxygen and alkali-containing vapors by superimposing directly on said layer a covering of a refractory layer which is free from chromium and which has a joint surface with the first said layer whereby the latter increases in thickness from an intermediate portion of its length towards the interior of the furnace.

10. A method as claimed in claim 9, wherein said layer of high refractory material is formed with its upper surface at the interior of the tank at the level of the top of the meniscus at the upper surface of the melt.

References Cited by the Examiner

UNITED STATES PATENTS

| | | | |
|---|---|---|---|
| 1,868,172 | 7/1932 | Leventry | 263—46 |
| 2,226,701 | 12/1940 | Benner et al. | 263—46 |
| 2,263,848 | 11/1941 | Keaney | 263—46 |
| 2,271,363 | 1/1942 | Field | 106—66 |
| 2,271,364 | 1/1942 | Field | 106—59 |
| 2,498,622 | 2/1950 | Mochel | 106—59 |

FREDERICK L. MATTESON, JR., *Primary Examiner.*

WILLIAM F. O'DEA, *Examiner.*

D. A. TAMBURRO, *Assistant Examiner.*